United States Patent [19]
Hirs

[11] Patent Number: 5,989,415
[45] Date of Patent: Nov. 23, 1999

[54] OIL SEPERATOR

[76] Inventor: Gene Hirs, 3822 W. Thirteen Mile Rd., Apt. D, Royal Oak, Mich. 48073

[21] Appl. No.: 09/076,953

[22] Filed: May 13, 1998

Related U.S. Application Data

[63] Continuation-in-part of application No. 08/784,084, Jan. 15, 1997, Pat. No. 5,795,478.

[51] Int. Cl.⁶ ........................................ C02F 1/40
[52] U.S. Cl. ........................ 210/138; 210/519; 210/521; 210/540; 210/DIG. 5
[58] Field of Search .................... 210/138, 519, 210/521, 522, 538, 540, DIG. 5

[56] References Cited

U.S. PATENT DOCUMENTS

| | | | |
|---|---|---|---|
| 1,405,126 | 1/1922 | Harris . | |
| 2,578,040 | 12/1951 | Booth et al. . | |
| 3,645,398 | 2/1972 | Fiocco | 210/73 |
| 3,853,753 | 12/1974 | Jones | 210/23 |
| 3,951,814 | 4/1976 | Krueger | 210/488 |
| 4,039,441 | 8/1977 | Fett | 210/23 R |
| 4,123,365 | 10/1978 | Middelbeeto | 210/540 |
| 4,411,791 | 10/1983 | Ward | 210/649 |
| 4,422,931 | 12/1983 | Wolde-Michael | 210/540 |
| 4,591,441 | 5/1986 | Sakai | 210/649 |
| 4,650,581 | 3/1987 | Angles et al. | 210/398 |
| 4,980,070 | 12/1990 | Lieberman | 210/DIG. 5 |
| 5,006,260 | 4/1991 | Roques et al. | 210/708 |
| 5,017,294 | 5/1991 | Durrieu | 210/708 |
| 5,022,992 | 6/1991 | Looker | 210/521 |
| 5,151,185 | 9/1992 | Himmerschmitt | 210/521 |
| 5,156,745 | 10/1992 | Cairo et al. | 210/703 |
| 5,411,665 | 5/1995 | Scraggs | 210/610 |
| 5,505,861 | 4/1996 | Hirs | 210/521 |
| 5,549,823 | 8/1996 | Hirs | 210/265 |
| 5,681,462 | 10/1997 | Brockhaff et al. | 210/DIG. 5 |
| 5,730,872 | 3/1998 | Rhodes | 210/519 |

FOREIGN PATENT DOCUMENTS 53 91 462   8/1978   Japan .

*Primary Examiner*—Christopher Upton
*Attorney, Agent, or Firm*—Lyon, P.C.

[57] ABSTRACT

A system for extracting free oil from industrial processing fluids comprises a coalescing cartridge having a plurality of vertically oriented polymeric elements therein past which fluid is free to flow without obstruction thereby supplying fluid to a tank having a plurality of settling chambers. Free oil is removed from the processing fluid through oleophilic attraction between the free oil and the surface of the polymeric elements. Remaining free oil is further separated from the processing fluid through gravitational attraction. A plurality of weirs and baffles interposed between the settling chambers provide continuous return of purified processing fluid to the system. A plurality of solenoid actuated valves provide periodic decanting of separated free oil.

9 Claims, 4 Drawing Sheets

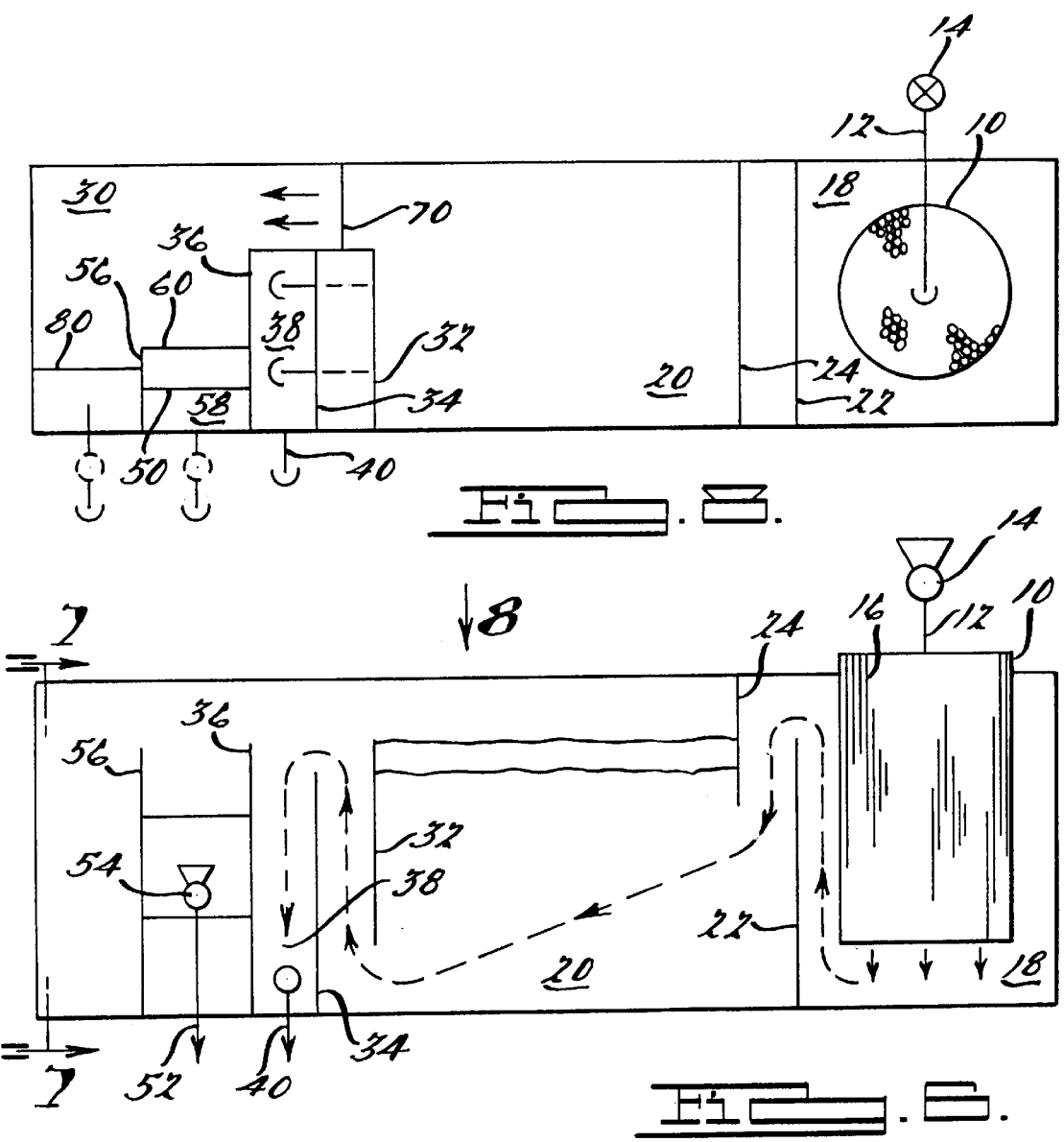
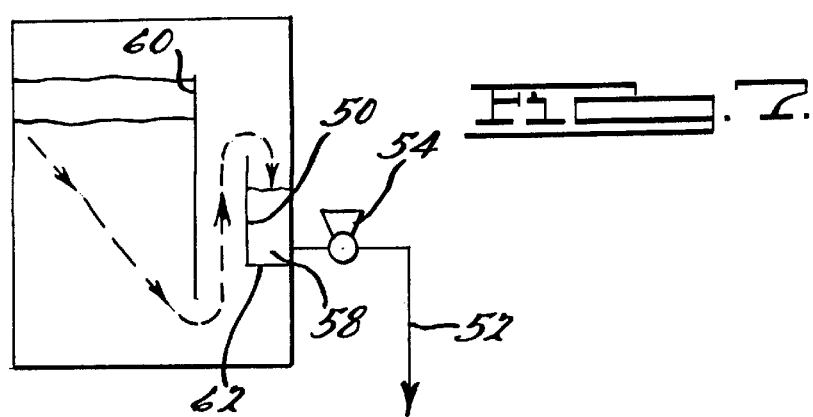

1

OIL SEPERATOR

CROSS REFERENCE TO RELATED APPLICATIONS

The present application is a continuation-in-part of U.S. application Ser. No. 08/784,084 filed on Jan. 15, 1997, now U.S. Pat. No. 5,795,478.

BACKGROUND OF THE INVENTION

The present invention relates generally to liquid purification systems and more particularly to a system for removing free oil from aqueous fluid mixtures utilized in industrial machining applications.

Industrial machining operations generally require the use of coolants to prevent damage to tools due to excessive heat. Typically, a coolant comprises an oil-in-water emulsion or an aqueous mixture wherein water is the continuous phase, oil is the disperse phase, and soap is the emulsifying agent.

The emulsion is stabilized by electro-mechanical forces which are weakened or destroyed by contaminants in the form of metallic ions, free oil and bacterial action. The primary culprit in coolant deterioration is free or "tramp" oil which must be removed to maintain the stability and equilibrium of the emulsion. Moreover, abrasive colloidal solids, often found suspended in the emulsion, cause a decline in the quality of the coolant and blockages in coolant filters.

SUMMARY OF THE INVENTION

The aforesaid problems are solved, in accordance with a preferred constructed embodiment of the present invention, by an oil separator that removes free oil from an aqueous oil-in-water emulsion. The oil separator is placed downstream of the machining process to accept the contaminated fluid produced during the machining operation.

The oil separator of the present invention comprises a plurality of spaced vertically oriented polymeric elements, for example plastic tubes, that are positioned above a primary settling chamber. Coolant flows downwardly through the elements without restriction. Oleophilic surface attraction between the polymeric elements and free oil in the coolant attracts and binds the free oil to the walls of the vertically oriented elements where further coalescing of the free oil occurs. The fluid and coalesced oil globules then flow out of the polymeric elements and into a primary settling chamber where gravitational separation of free oil and processing fluid occurs.

Oil globules rise upwardly through the fluid mixture, flowing over a primary oil weir and onto the surface of the fluid in a secondary settling chamber. Separated coolant is directed beneath a baffle and over a primary fluid weir where free oil again rises and flows into the secondary settling chamber. A primary fluid decant chamber, separated from the secondary settling chamber by a decant chamber wall, is provided with an outlet conduit to allow purified fluid to flow back to the system. Once in the secondary settling chamber, fluid flows over a secondary fluid weir where a second outlet conduit which is opened and closed by a normally open outlet valve is provided to return the remaining purified fluid to the system.

Waste oil decanting is accomplished by closing the normally open outlet valve until the fluid level in the secondary settling chamber rises to the level required to allow waste oil to flow over a waste oil weir into a waste oil chamber. The waste oil chamber is provided with a waste oil conduit that allows for decanting of waste oil. The waste oil chamber is further provided with a bottom that prevents separated waste oil that flows over the weir from draining back into the secondary settling chamber.

The aforesaid operation is controlled by a timer that provides for a predetermined waste oil removal period during which the normally open outlet valve is energized closed thereby raising the fluid level in the secondary settling chamber to allow the separated oil to flow over the waste oil weir for decanting. By adjusting a fluid inlet valve that controls coolant flow into the inlet plenum, coolant flow through the separator may be limited such that the total fluid flow through the secondary settling chamber is five to ten percent of the total flow through the entire system.

This flow limitation allows for maximum efficiency in waste oil separation and decanting. Furthermore, the use of flow limited multistage gravitational separation eliminates the necessity of employing a surface skimmer to remove waste oil from the surface of the aqueous mixture. Known in the art surface skimmers often suffer from the disadvantage that they remove large quantities of coolant mixture from the system, in addition to surface resident waste oil, thereby providing for inefficient oil separation.

Therefore, one object of the instant invention is to provide an oil separator that collects and decants a greater concentration of waste oil than known oil separators.

A further object of the present invention is to provide an oil separator that decants waste oil without employing inefficient surface skimmers.

BRIEF DESCRIPTION OF THE DRAWINGS

FIG. 6 is a sectional elevational view of an alternative embodiment of the invention showing a coalescing cartridge disposed within an inlet plenum.

FIG. 7 is a view of an alternative embodiment of the present invention taken along the line 7—7 of FIG. 6.

FIG. 8 is a view of an alternative embodiment of the present invention taken along the line 8 of FIG. 6.

DETAILED DESCRIPTION OF THE PREFERRED EMBODIMENT

Figure 1:
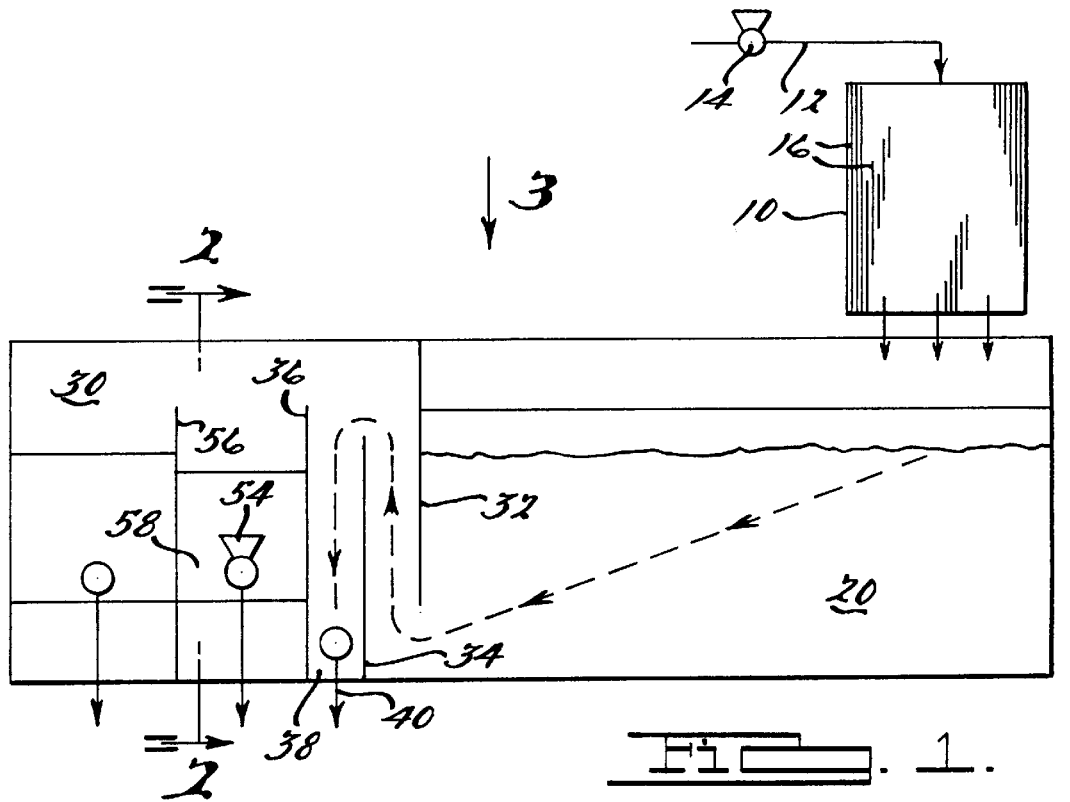
FIG. 1 is a sectional elevational view of a preferred constructed embodiment of the present invention.
Figure 2:
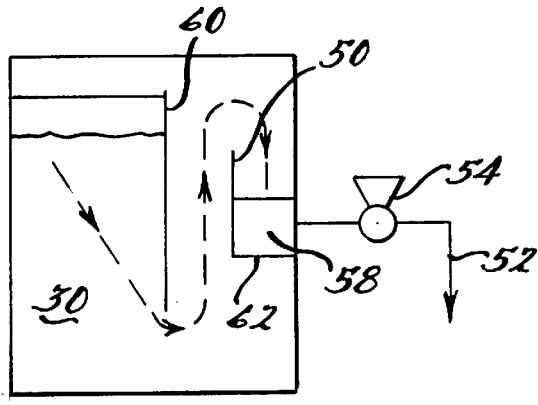
FIG. 2 is a view of the present invention taken along the line 2—2 of FIG. 1.
Figure 3:
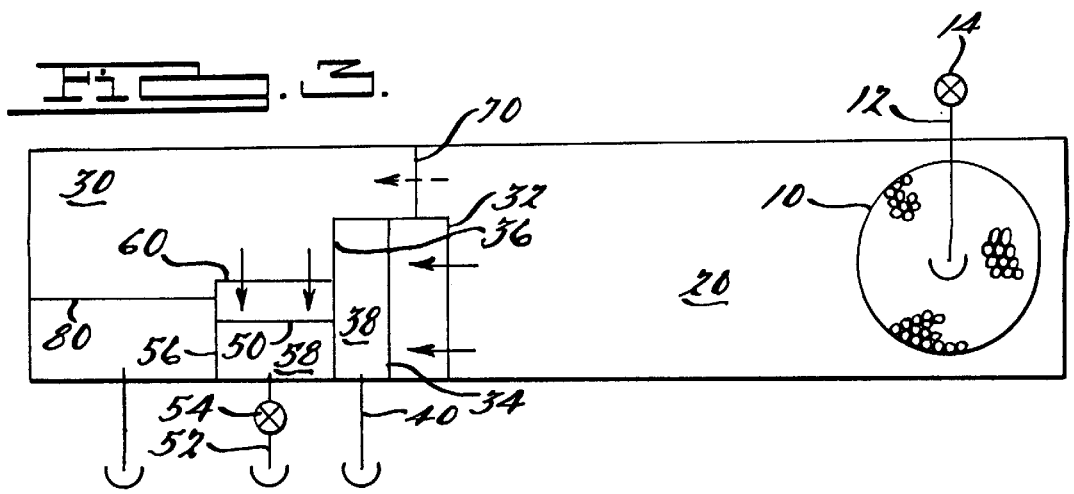
FIG. 3 is a view of the instant invention taken along the line 3 of FIG. 1.

As shown in FIGS. 1, 2, and 3, a system for separating oil from an aqueous industrial processing fluid mixture comprises an oil coalescing cartridge 10 for acceptance of fluid through a fluid inlet conduit 12. The fluid inlet conduit 12 is provided with an inlet valve 14 which may be utilized to adjust the total fluid flow into the separator. The oil coalescing cartridge 10 is comprised of spaced vertically oriented polymeric elements 16 positioned above a primary settling chamber 20 such that the entering fluid flows downwardly through the cartridge 10 and into the settling chamber 20. In a preferred constructed embodiment of the present invention the oil coalescing cartridge 10 is comprised of a plurality of polymeric elements 16, for example high-density polyethylene tubes 4 to 5 feet in length, arranged vertically above the primary settling chamber.

Figure 9:
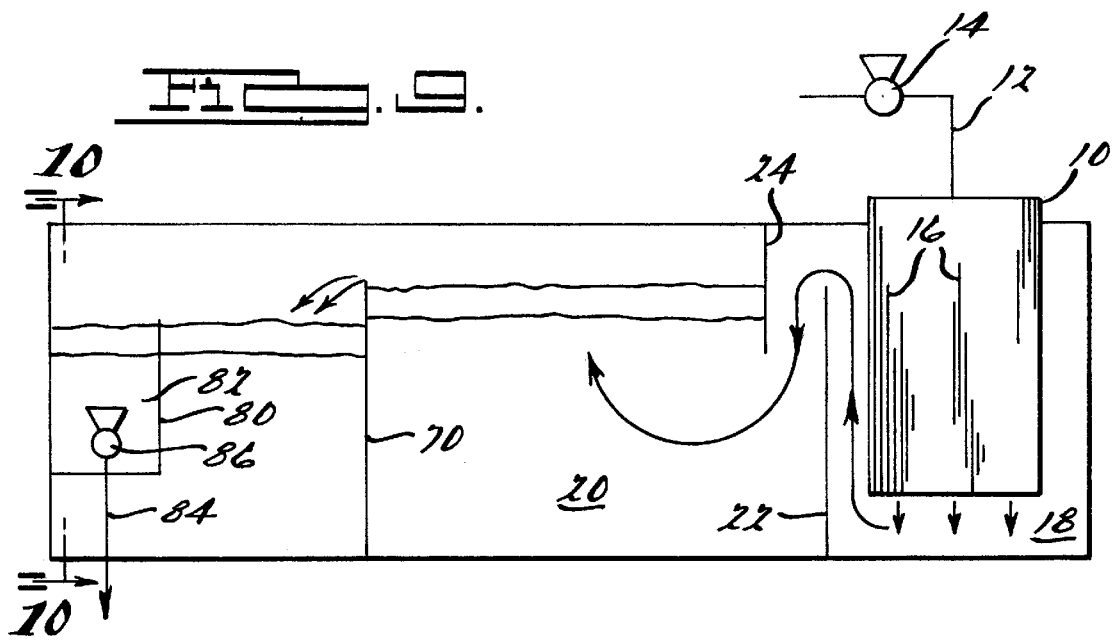
FIG. 9 is a sectional elevational view of an alternative embodiment of the present invention showing only the flow of separated oil through the system.

In an alternative embodiment of the instant invention as shown in FIGS. 6, 8 and 9, the primary settling chamber 20 is further provided with an intake plenum 18 that is separated from the primary settling chamber 20 by an inlet weir 22 extending upwardly from the bottom of the intake plenum 10 and an inlet baffle 24 extending downwardly from the top of the settling chamber 20. The coalescing cartridge 10 is then positioned within the intake plenum 18 such that the entering fluid flows downwardly through the cartridge 10 and into the inlet plenum 18. The inlet weir 22 then directs fluid upwardly from the bottom of the intake plenum 10 towards the inlet baffle 24. The inlet baffle 24 then directs the fluid flow downwardly into the primary settling chamber 20.

As seen in FIGS. 1 and 3, a secondary settling chamber 30 is separated from the primary settling chamber 20 by a primary fluid baffle 32 extending downwardly from the top of the primary settling chamber 20, a primary fluid weir 34 extending upwardly from the bottom of the secondary settling chamber 30 and a decant chamber wall 36, also extending upwardly from the bottom of the secondary settling chamber 30. Fluid weir 34 and decant chamber wall 36 depend from a first wall of the secondary settling chamber 30 to define a primary coolant decant chamber 38. The primary fluid baffle 32 directs fluid upwardly from the primary settling chamber 20, over the top of primary fluid weir 34 and into primary decant chamber 38. The primary decant chamber 38 is provided with a conduit 40 for allowing the purified processing fluid to flow back to the system.

In accordance with the preferred constructed embodiment of the instant invention and as shown in FIGS. 1 and 3, a secondary fluid weir 50 abuts the decant chamber wall 36 on a first side and a secondary fluid chamber wall 56 on a second side. The secondary fluid chamber wall 56 depends from the first wall of the secondary settling chamber 30 and abuts the secondary fluid weir 50 on one side. A secondary fluid chamber 58 is bounded by secondary fluid chamber wall 56, secondary fluid weir 50, decant chamber wall 36, and the first wall of the secondary settling chamber 30. Furthermore, the secondary fluid chamber 58 is provided with an outlet conduit 52 that is opened and closed by a normally open solenoid valve 54 for releasing purified processing fluid back to the system. The normally open valve 54 is solenoid actuated in an alternative embodiment of the instant invention.

A secondary fluid baffle 60, is positioned between decant chamber wall 36 and secondary fluid chamber wall 56, parallel to secondary fluid weir 50. The secondary fluid baffle 60 is spaced from the bottom of the secondary settling chamber 30 such that purified fluid flows from secondary settling chamber 30 under the secondary fluid baffle 60 and then up and over secondary fluid weir 50 into secondary fluid chamber 58 prior to returning to the system through conduit 52. The secondary fluid chamber 58 is further provided with a bottom 62 that prevents purified fluid from flowing back into the secondary settling chamber 30.

Figure 4:
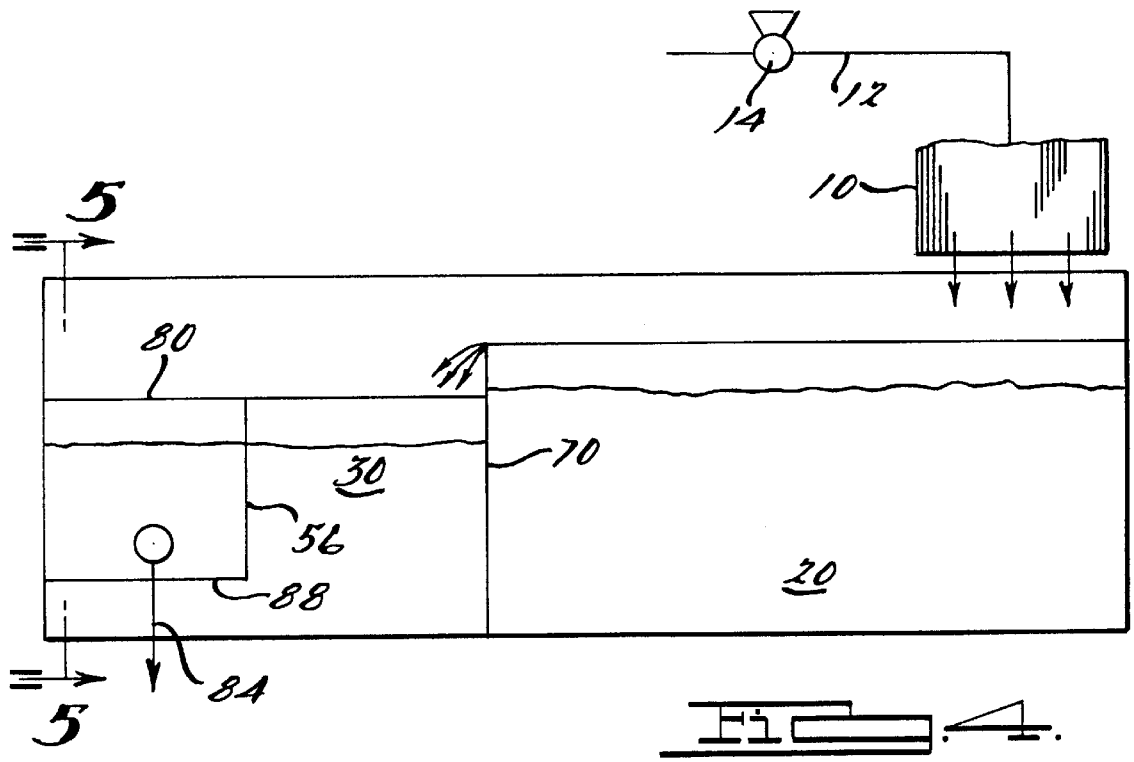
FIG. 4 is a sectional elevational view of the present invention showing only the flow of separated oil through the system.

In a preferred constructed embodiment of the instant invention and in accordance with FIGS. 3 and 4, a primary oil weir 70 is interposed between the primary settling chamber 20 and the secondary settling chamber 30 adjacent to the primary fluid baffle 32. The primary oil weir 70 separates the primary settling chamber 20 from the secondary settling chamber 30 such that waste oil on the surface of the fluid in the primary settling chamber 20 flows over the primary oil weir 70 and onto the surface of the fluid in the secondary settling chamber 30.

Figure 5:
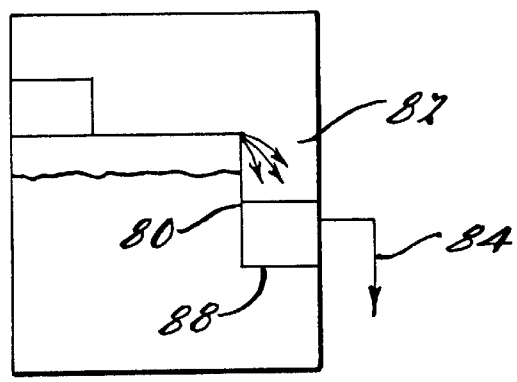
FIG. 5 is a view of the present invention taken along the line 5—5 of FIG. 4.

As shown in FIGS. 3, 4 and 5, a waste oil weir 80 is disposed within secondary settling chamber 30 adjacent to the secondary fluid weir 50 such that waste oil floating on the surface of secondary settling chamber 30 flows up and over waste oil weir 80 when the fluid level in the secondary settling chamber 30 is sufficiently high. For reasons explained hereinbelow, the top of the waste oil weir 80 must be higher than the top of secondary fluid weir 50 such that fluid will flow over secondary fluid weir 50 prior to reaching the top of waste oil weir 80. The waste oil weir 80 depends from a waste oil bottom 88 that prevents oil flowing over the waste oil weir 80 from flowing back into the secondary settling chamber 30. A waste oil chamber 82 is bounded by the waste oil weir 80, the secondary fluid chamber wall 56, the waste oil bottom 88, and first and second walls of the secondary settling chamber 30. The waste oil chamber 82 is further provided with a waste oil conduit 84 that allows waste oil to be decanted at timed intervals as explained hereinbelow.

Figure 10:
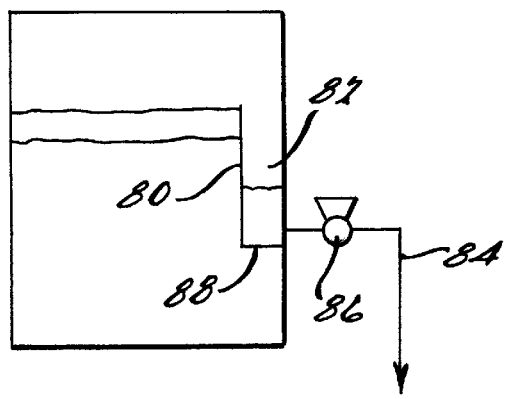
FIG. 10 is a view of an alternative embodiment of the present invention taken along the line 10—10 of FIG. 9.

In an alternative embodiment of the instant invention as shown in FIGS. 9 and 10, the waste oil conduit 84 is opened and closed by a normally closed solenoid actuated valve 86 for waste oil decanting at timed intervals.

Figure 11:
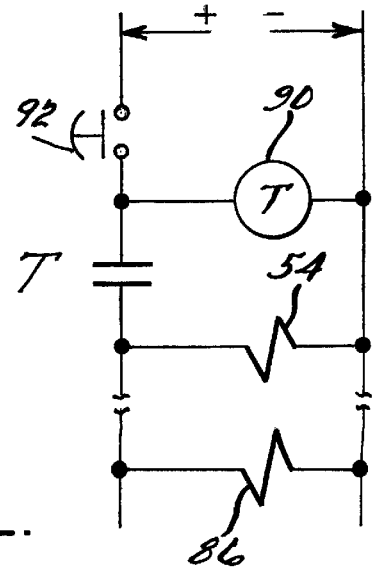
FIG. 11 is an electrical schematic of a control circuit for the solenoid valves utilized in the present invention.

As shown in FIG. 11 both the normally open valve 54 and the normally closed valve 86 utilized in the alternative embodiment of the present invention are actuated by a timer 90 that energizes the solenoid valves for predetermined time intervals. The timer duration may be selected to maximize separator efficiency while providing for regular decanting of waste oil depending on the concentration of oil in the processing fluid and the fluid flow rate through the system. In one embodiment of the present invention the timer may be activated or deactivated by a conventional pushbutton 92, or alternatively, by any switching means, when oil decanting is desired.

Operation of the oil separator begins when oil-contaminated processing fluid supplied through the intake conduit 12 flows downwardly through the oil coalescing cartridge 10 and into the primary settling chamber 20. Alternatively, and in accordance with the alternative embodiment of the present invention as shown in FIG. 6, the fluid supplied through the intake conduit flows downwardly through the oil coalescing cartridge 10 and into the bottom of the intake plenum 18. The fluid is directed upwardly by the inlet weir 22 and then downwardly into the primary settling chamber 20 by the inlet baffle 24. The inlet baffle 24 acts to minimize flow turbulence caused by fluid flow through the coalescing cartridge 10 and distributes fluid flow evenly across the primary settling chamber 20.

In the primary settling chamber 20 the lighter coalesced oil rises to the top of the fluid mixture and the denser processing fluids settle to the bottom of the chamber 20. The primary fluid baffle 32 then directs separated processing fluid into the primary decant chamber 38 defined by primary fluid weir 34 and decant chamber wall 36 where it flows back to the processing fluid system through the conduit 40. Referring to the flow of oil through the system as shown in FIG. 9, the coalesced oil on top of the primary settling chamber 20 flows up and over the primary oil weir 70 and into the secondary settling chamber 30. In order to assure complete separation of the free oil from the processing fluid, inlet fluid flow may be limited by adjustment of the inlet valve 14 such that the oil-contaminated fluid resides in the primary settling chamber 20 for ten to twenty minutes before flowing back into the system.

The remaining processing fluid in the secondary settling chamber 30 is allowed to settle to the bottom of the chamber and is then directed downwardly by the secondary water baffle 60 over the secondary water weir 50, and into secondary fluid chamber 58. The outlet conduit 42 and the normally open valve 44 allow the purified processing fluid to flow back into the system. In a preferred embodiment of the instant invention the amount of fluid flow out of the secondary fluid chamber 58 should be in the range of 5 to 10 percent of the total fluid flow through the separator. Therefore, the fluid flow out of the primary decant chamber 38 should be 90 to 95 percent of the total flow through the system.

Oil collects on the surface of the fluid in the secondary settling chamber 30 until the timer 90 times out, thereby initiating oil decanting. Timer 90 is initiated at preset time intervals to actuate the normally open valve 54. When the normally open valve 54 is actuated it closes, thereby terminating the flow of fluid out of the secondary fluid chamber 58 and causing the fluid level in the secondary settling chamber 30 to rise. When the fluid level in the secondary settling chamber 30 reaches the top of the waste oil weir 80, the oil collected on the surface of the fluid flows into the waste oil chamber 82 and out of the system through the waste oil conduit 84.

In accordance with the alternative embodiment of the instant invention as shown in FIGS. 9 and 10, upon initiation of the timer 90 at its preset time interval the normally closed valve 86 is energized to the open position and thus waste oil is decanted from the chamber 82 through the waste oil conduit 84. The timer 90 duration is adjustable depending on the amount of waste oil to be decanted. The normally closed valve 86 prevents inadvertent decanting from the waste oil chamber 82 until decanting is desired. Additionally, pushbutton 92 may remove power from timer 90, thereby terminating the timed operation of the solenoid actuated valves for purposes of maintenance or manual decanting of oil.

Although the preferred embodiments of the instant invention have been disclosed in detail, it will be appreciated by one of ordinary skill in the art that the various structural and operational features herein disclosed are susceptible to modification without departing from the scope of the following claims.

I claim:

1. A system for separating oil from industrial processing fluid comprising:
   a primary settling chamber;
   an oil coalescing cartridge having a plurality of vertically oriented polymeric elements and an inlet conduit for the acceptance of processing fluid, said coalescing cartridge positioned above said primary settling chamber for supplying said processing fluid to said primary settling chamber;
   a secondary settling chamber having a plurality of walls;
   a primary fluid weir interposed between said secondary settling chamber and said primary settling chamber, said primary fluid weir extending upwardly from the bottom of said primary settling chamber;
   a primary fluid baffle interposed between said primary settling chamber and said primary fluid weir, said primary fluid baffle extending downwardly from the top of said primary settling chamber so as to direct said processing fluid upwardly towards said primary fluid weir;
   a decant chamber wall interposed between said primary fluid weir and said secondary settling chamber, said decant chamber wall extending upwardly from the bottom of said secondary settling chamber;
   a primary fluid decant chamber bounded by said primary fluid weir, said decant chamber wall, and a first wall of said secondary settling chamber, said primary fluid decant chamber having a conduit for removing said processing fluid;
   a secondary fluid weir disposed within said secondary settling chamber and depending from said decant chamber wall;
   a secondary fluid baffle interposed between said secondary settling chamber and said secondary fluid weir, said secondary baffle depending from said decant chamber wall and extending downwardly from the top of said secondary settling chamber whereby said fluid is directed upwardly towards said secondary fluid weir;
   a secondary fluid chamber wall depending from the first wall of said secondary settling chamber at a first end and abutting said secondary fluid baffle at a second end;
   a secondary fluid chamber bounded by said secondary fluid chamber wall, said secondary fluid weir, and said decant chamber wall, said secondary fluid chamber having a conduit that is opened and closed by a normally open solenoid actuated valve for removing said processing fluid;
   a primary oil weir interposed between said primary settling chamber and said secondary settling chamber adjacent said primary fluid baffle wherein said oil flows up and over said primary oil weir and into said secondary settling chamber;
   a waste oil weir disposed within said secondary settling chamber and depending from a second wall of said secondary fluid chamber;
   a waste oil chamber disposed within said secondary settling chamber, said waste oil chamber being bounded by said waste oil weir and the first and second walls of said secondary settling chamber, whereby waste oil flowing over said waste oil weir into said waste oil chamber is separated from said secondary settling chamber, said waste oil chamber further having a waste oil conduit for removing said oil; and
   a timer actuating said normally open solenoid actuated valve at predetermined intervals whereby the duration of waste oil decanting from said waste oil chamber is controlled by said timer.

2. The system of claim 1 further comprising:
   an inlet valve for opening and closing said inlet conduit;
   a fluid intake plenum disposed within said primary settling chamber;
   an inlet weir interposed between said intake plenum and said primary settling chamber extending upwardly from the bottom of said intake plenum whereby said inlet weir directs said fluid upwardly;
   an inlet baffle interposed between said inlet weir and said primary settling chamber, said inlet baffle extending downwardly from the top of said settling chamber whereby said inlet baffle directs said fluid downwardly into said primary settling chamber; and
   wherein said coalescing cartridge is disposed within said intake plenum.

3. The system of claim 2 further comprising a normally closed solenoid valve for opening and closing the waste oil conduit, wherein said timer actuates said normally open solenoid valve and said normally closed solenoid valve at predetermined intervals whereby the duration of waste oil decanting from said waste oil chamber is controlled by said timer.

4. The system of claim 3 wherein said timer is deactivated by a pushbutton.

5. The system of claim 2 wherein said timer is deactivated by a pushbutton.

6. The system of claim 1 further comprising a normally closed solenoid valve for opening and closing the waste oil conduit, wherein said timer actuates said normally open solenoid valve and said normally closed solenoid valve at predetermined intervals whereby the duration of waste oil decanting from said waste oil chamber is controlled by said timer.

7. The system of claim 6 wherein said timer is deactivated by a pushbutton.

8. The system of claim 1 wherein said timer is deactivated by a pushbutton.

9. A system for separating oil from industrial processing fluid comprising:

a primary settling chamber having a plurality of walls and bounded at one end by a downwardly extending primary fluid baffle for directing said processing fluid downwardly, and an upwardly extending primary oil weir adjacent thereto;

an oil coalescing cartridge having a plurality of vertically oriented polymeric elements and an inlet conduit for the acceptance of processing fluid, said coalescing cartridge positioned above said primary settling chamber for supplying said processing fluid to said primary settling chamber;

a secondary settling chamber for the acceptance of separated oil having a plurality of walls and bounded on one end by the primary oil weir, whereby separated oil flows over the primary oil weir into said secondary settling chamber;

a primary fluid decant chamber bounded by a plurality of walls and on one end by a primary fluid weir disposed adjacent the primary fluid baffle and extending upwardly form the bottom of said decant chamber to direct fluid upwardly, said primary fluid decant chamber further having a conduit for removing said processing fluid;

a secondary fluid chamber having a conduit that is opened and closed by a normally open solenoid actuated valve for removing said processing fluid, said secondary fluid chamber bounded by a plurality of walls including a secondary fluid weir extending upwardly from the bottom of said secondary fluid chamber;

a secondary fluid baffle disposed between said secondary settling chamber and the secondary fluid weir and extending downwardly from the top of said secondary settling chamber whereby said fluid is directed upwardly towards said secondary fluid weir;

a waste oil chamber bounded by a plurality of walls and separated from said secondary settling chamber by a waste oil weir whereby waste oil flows over the waste oil weir into said waste oil chamber, said waste oil chamber further having a waste oil conduit for removing said waste oil; and a timer actuating said normally open solenoid actuated valve at predetermined intervals whereby the duration of waste oil decanting from said waste oil chamber is controlled by said timer.

* * * * *